United States Patent
Huff et al.

(10) Patent No.: US 7,385,300 B2
(45) Date of Patent: Jun. 10, 2008

(54) METHOD AND APPARATUS FOR DETERMINING ACTUAL REACTIVE CAPABILITY CURVES

(75) Inventors: Frederick C. Huff, Pittsburgh, PA (US); Xu Cheng, Pittsburgh, PA (US); Peter N. Francino, Renfrew, PA (US)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 0 days.

(21) Appl. No.: 11/685,576

(22) Filed: Mar. 13, 2007

(65) Prior Publication Data

US 2007/0162189 A1 Jul. 12, 2007

Related U.S. Application Data

(60) Division of application No. 11/079,667, filed on Mar. 14, 2005, now Pat. No. 7,190,149, which is a continuation-in-part of application No. 10/876,431, filed on Jun. 25, 2004, now Pat. No. 7,288,921.

(51) Int. Cl.
*F02D 29/06* (2006.01)
*F02D 31/00* (2006.01)
*F02D 35/00* (2006.01)
*H02P 9/04* (2006.01)
*F03D 9/00* (2006.01)

(52) U.S. Cl. ............... 290/40 F; 290/40 A; 290/44
(58) Field of Classification Search ............. 290/40 A, 290/40 F, 44
See application file for complete search history.

(56) References Cited

U.S. PATENT DOCUMENTS

| | | | | |
|---|---|---|---|---|
| 3,683,161 A | 8/1972 | Stadlin et al. | ......... | 235/151.21 |
| 3,808,409 A | 4/1974 | Enns et al. | ............. | 235/151.21 |
| 3,839,629 A | 10/1974 | Russell | .................. | 235/151.21 |
| 3,886,330 A | 5/1975 | Egelston et al. | ........ | 235/151.21 |

(Continued)

FOREIGN PATENT DOCUMENTS

| EP | 1 478 074 | | 11/2004 |
|---|---|---|---|
| JP | 11187574 A | * | 7/1999 |
| WO | WO 96/33544 | | 10/1996 |
| WO | WO 02/057968 | | 7/2002 |

OTHER PUBLICATIONS

Cheng et al., "Model Based Simulation Study on Corporate-wide Load Dispatch Optimization with Pollution Control," The Instrumentation, Systems and Automation Society, 2003.
Cheng et al., "A Unified Approach to Load Dispatch and Pollution Control Optimization," The Instrumentation, Systems and Automation Society, 2004.
WE Energies—Port Washington, Economic Dispatch, Design Document, Revision 3, Jan. 2004.

*Primary Examiner*—Darren Schuberg
*Assistant Examiner*—Pedro J. Cuevas
(74) *Attorney, Agent, or Firm*—Marshall, Gerstein & Borun LLP

(57) ABSTRACT

A system for generating updated reactive capability curves of a generator operates the genarator at a number of operating load levels and at a number of different power factors to collect data regarding the real and reactive power generated at each of the various operating load levels and power factors. Subsequently, the system analyzes the collected data to determine an actual reactive capability curve of the generator. The system also provides generator health monitoring and identifies changes and trends in the capability curves of the generator. The updated reactive capability curves may be used by an economic dispatch program in determining optimum MW and MVAR setpoints for the generator.

5 Claims, 9 Drawing Sheets

U.S. PATENT DOCUMENTS

| | | | |
|---|---|---|---|
| 3,886,332 A | 5/1975 | Petit et al. | 235/151.21 |
| 3,903,399 A | 9/1975 | Enns et al. | 235/151.21 |
| 3,903,402 A | 9/1975 | Petit et al. | 235/151.21 |
| 3,911,286 A | 10/1975 | Uram | 290/40 |
| 3,913,829 A | 10/1975 | Fink | 235/151.21 |
| 3,928,972 A | 12/1975 | Osborne | 60/646 |
| 3,932,735 A | 1/1976 | Giras | 235/151.21 |
| 3,949,291 A | 4/1976 | Kanngiesser et al. | 323/105 |
| 4,029,951 A * | 6/1977 | Berry et al. | 700/289 |
| 4,069,675 A | 1/1978 | Adler et al. | 60/667 |
| 4,075,699 A | 2/1978 | Schneider et al. | 364/492 |
| 4,280,060 A | 7/1981 | Kure-Jensen et al. | 290/40 R |
| 4,305,129 A | 12/1981 | Yannone et al. | 364/492 |
| 4,445,045 A | 4/1984 | Ross | 290/40 B |
| 4,482,857 A | 11/1984 | Porche et al. | 323/205 |
| 4,492,874 A * | 1/1985 | Near | 290/40 B |
| 4,514,642 A | 4/1985 | Ross | 290/40 R |
| 4,590,416 A | 5/1986 | Porche et al. | 323/205 |
| 4,602,206 A * | 7/1986 | Walker | 323/211 |
| 4,689,752 A | 8/1987 | Fernandes et al. | 364/492 |
| 4,695,785 A * | 9/1987 | Mieth et al. | 323/222 |
| 4,714,893 A | 12/1987 | Smith-Vaniz | 324/126 |
| 4,723,220 A | 2/1988 | Smith-Vaniz | 364/492 |
| 4,745,512 A | 5/1988 | Hampson | 361/36 |
| 4,745,758 A | 5/1988 | Putman et al. | 60/676 |
| 4,746,241 A | 5/1988 | Burbank, III | 403/344 |
| 4,794,328 A | 12/1988 | Fernandes et al. | 324/127 |
| 4,796,027 A | 1/1989 | Smith-Vaniz | 340/870.03 |
| 4,866,940 A | 9/1989 | Hwang et al. | 60/646 |
| 4,868,410 A | 9/1989 | Nakamura | 307/20 |
| 4,881,184 A | 11/1989 | Abegg, III et al. | 364/551.01 |
| 4,888,954 A | 12/1989 | Silvestri, Jr. | 60/660 |
| 4,891,948 A | 1/1990 | Kure-Jensen et al. | 60/645 |
| 5,081,591 A | 1/1992 | Hanway et al. | 364/485 |
| 5,159,562 A | 10/1992 | Putman et al. | 364/494 |
| 5,278,772 A | 1/1994 | Knupp | 364/492 |
| 5,321,308 A | 6/1994 | Johncock | 290/40 C |
| 5,347,466 A | 9/1994 | Nichols et al. | 364/492 |
| 5,432,710 A | 7/1995 | Ishimaru et al. | 364/493 |
| 5,517,423 A | 5/1996 | Pomatto | 364/492 |
| 5,581,470 A | 12/1996 | Pawloski | 364/483 |
| 5,621,654 A | 4/1997 | Cohen et al. | 364/493 |
| 5,715,165 A | 2/1998 | Luh et al. | 364/474.15 |
| 5,796,628 A | 8/1998 | Chiang et al. | 364/492 |
| 5,798,631 A | 8/1998 | Spee et al. | 322/25 |
| 6,021,402 A | 2/2000 | Takriti | 705/412 |
| 6,037,672 A * | 3/2000 | Grewe | 290/40 A |
| 6,204,642 B1 | 3/2001 | Lawson et al. | 322/20 |
| 6,294,898 B2 | 9/2001 | Lawson et al. | 322/20 |
| 6,417,650 B1 * | 7/2002 | Stefanovic et al. | 322/47 |
| 6,492,801 B1 | 12/2002 | Sims et al. | 324/142 |
| 6,512,966 B2 | 1/2003 | Lof et al. | 700/291 |
| 6,670,721 B2 * | 12/2003 | Lof et al. | 290/44 |
| 6,671,585 B2 | 12/2003 | Lof et al. | 700/291 |
| 6,696,811 B2 * | 2/2004 | Reutlinger | 318/606 |
| 6,707,279 B2 * | 3/2004 | Stefanovic et al. | 322/47 |
| 6,775,597 B1 | 8/2004 | Ristanovic et al. | 700/293 |
| 6,853,930 B2 | 2/2005 | Hayashi et al. | 702/61 |
| 6,900,998 B2 * | 5/2005 | Erickson et al. | 363/159 |
| 6,907,381 B2 | 6/2005 | Hayashi et al. | 702/181 |
| 6,924,628 B2 | 8/2005 | Thompson | 322/20 |
| 7,038,330 B2 | 5/2006 | Rosebrock et al. | 290/44 |
| 7,065,472 B2 | 6/2006 | Hayashi et al. | 702/184 |
| 7,190,149 B2 * | 3/2007 | Huff et al. | 322/20 |
| 7,253,634 B1 * | 8/2007 | Kasztenny et al. | 324/510 |
| 7,272,514 B2 * | 9/2007 | Qi et al. | 702/57 |
| 2001/0001534 A1 | 5/2001 | Lawson et al. | 322/20 |
| 2002/0070713 A1* | 6/2002 | Stefanovic et al. | 322/24 |
| 2004/0022081 A1 | 2/2004 | Erickson et al. | 363/159 |
| 2005/0172995 A1 | 8/2005 | Rohrig et al. | 136/243 |
| 2005/0236838 A1* | 10/2005 | Rosebrock et al. | 290/44 |
| 2006/0085363 A1 | 4/2006 | Cheng et al. | 705/400 |
| 2006/0273595 A1* | 12/2006 | Avagliano et al. | 290/44 |
| 2006/0284604 A1* | 12/2006 | Qi et al. | 322/7 |
| 2006/0287838 A1* | 12/2006 | Qi et al. | 702/57 |
| 2007/0024257 A1* | 2/2007 | Boldo | 323/282 |
| 2007/0027644 A1* | 2/2007 | Bettenwort et al. | 702/60 |

* cited by examiner

METHOD AND APPARATUS FOR DETERMINING ACTUAL REACTIVE CAPABILITY CURVES

CROSS REFERENCE TO RELATED APPLICATION

This application is a divisional application of U.S. patent application Ser. No. 11/079,667 entitled "Method and Apparatus for Determining Actual Reactive Capability Curves," which was filed Mar. 14, 2005, now U.S. Pat. No. 7,190,149, which is a continuation in part (CIP) application to the U.S. patent application Ser. No. 10/876,431 entitled "Method and Apparatus for Providing Economic Analysis of Power Generation and Distribution," which was filed on Jun. 25, 2004, now U.S. Pat. No. 7,288,921, the specifications of which are expressly incorporated by reference herein.

TECHNICAL FIELD

This patent relates generally to computer software, and more particularly to computer software used in electric power generation and distribution systems.

BACKGROUND

Almost every aspect of life in the twenty-first century involves the use of electric power. However, most users of electricity do not realize that, before electricity reaches their premises, it travels through a complex network of electric power generation and distribution systems. The complexity of power generation and distribution is frequently underscored by blackouts, such as those that occurred over most of the northeastern United States and Canada on Aug. 14th and 15th of 2003, which make it clear that the various processes and systems involved in the generation and the distribution of electricity require very careful planning.

In the United States, electric power generation and distribution was traditionally highly regulated by federal government agencies, such as the Federal Energy Regulatory Committee (FERC), as well as by utility commissioners of various states. These regulating bodies set performance standards and requirements for the generation and the distribution of electric power for the utility companies (hereinafter referred to as "utilities") which generated and distributed electric power. For example, these regulating bodies specified the requirements for real power at various points on the electric distribution systems. In response to the specified requirements, the utilities determined how much electricity to produce, where to produce it, and how to distribute it.

Utilities generate electricity using various types of power generators, which may be categorized depending on the energy used to generate electricity, into thermal, nuclear, wind, hydroelectric, etc., generators. Each of these various types of generators operates under different sets of constraints. For example, an output of a thermal generator is a function of the heat generated in a boiler, wherein the heat generated per hour is constrained by the amount of fuel that can be burned per hour.

Once the utilities received the requirements for real power to be delivered, the utilities determined which generation unit to use at what level. In making this determination, the utilities took into consideration the constraints on each of the available power generators. Moreover, to minimize the cost of power generation, the utilities typically tried to find the optimum combination of power generation using any of a number of sophisticated mathematical and forecasting models available for planning the generation of electricity. Specifically, computer programs generally known as economic dispatch programs were available to help utilities make decisions related to the operation of electric generators based on real power requirements.

As is well known, electric power includes both real power, which is given in megawatts (MWs), and reactive power, which is given in mega volt-amperes reactive (MVARs). Because, utilities traditionally received requirements for electric power in real power only, traditional economic dispatch programs determined optimum operating solutions only in terms of real power. As a result, these programs allowed utilities to determine optimal operation of various generators based on a specified real power, but did not take into account the reactive power requirement. However, it is necessary to keep a certain level of reactive power on the electric distribution grids to avoid damage to transformers and other electrical distribution equipments. As a result, utilities still have to generate and distribute at least some reactive power.

The behavior of generators with respect to the generation of reactive power is provided by the so called reactive capability curves of the generators. The reactive capability curves are a graphical representation of the reactive and real power produced by the generators under various operating conditions, as specified by the cold gas pressure and cold gas temperature inside the generators as well as the power factor of the generated electric power. Manufacturers of the generators provide the estimated reactive capability curves to the operators of the generators. However, as generators are used, over time the actual reactive capability curves of the generators would deviate from the estimated reactive capability curves. Therefore, it is necessary to provide a method to determine updated reactive capability curves that may be used by an economic dispatch program used by the power plants.

DETAILED DESCRIPTION OF THE EXAMPLES

A system for generating updated reactive capability curves of a generator operates the generator at a number of operating load levels and at a number of different power factors to collect data regarding the real and reactive power generated at each of the various operating load levels and power factors. Subsequently, the system analyzes the collected data to determine an actual reactive capability curve of the generator. The system also provides generator health monitoring and identifies changes and trends in the capability curves of the generator. The updated reactive capability curves may be used by an economic dispatch program in determining optimum MW and MVAR set-points for the generator.

Figure 1:
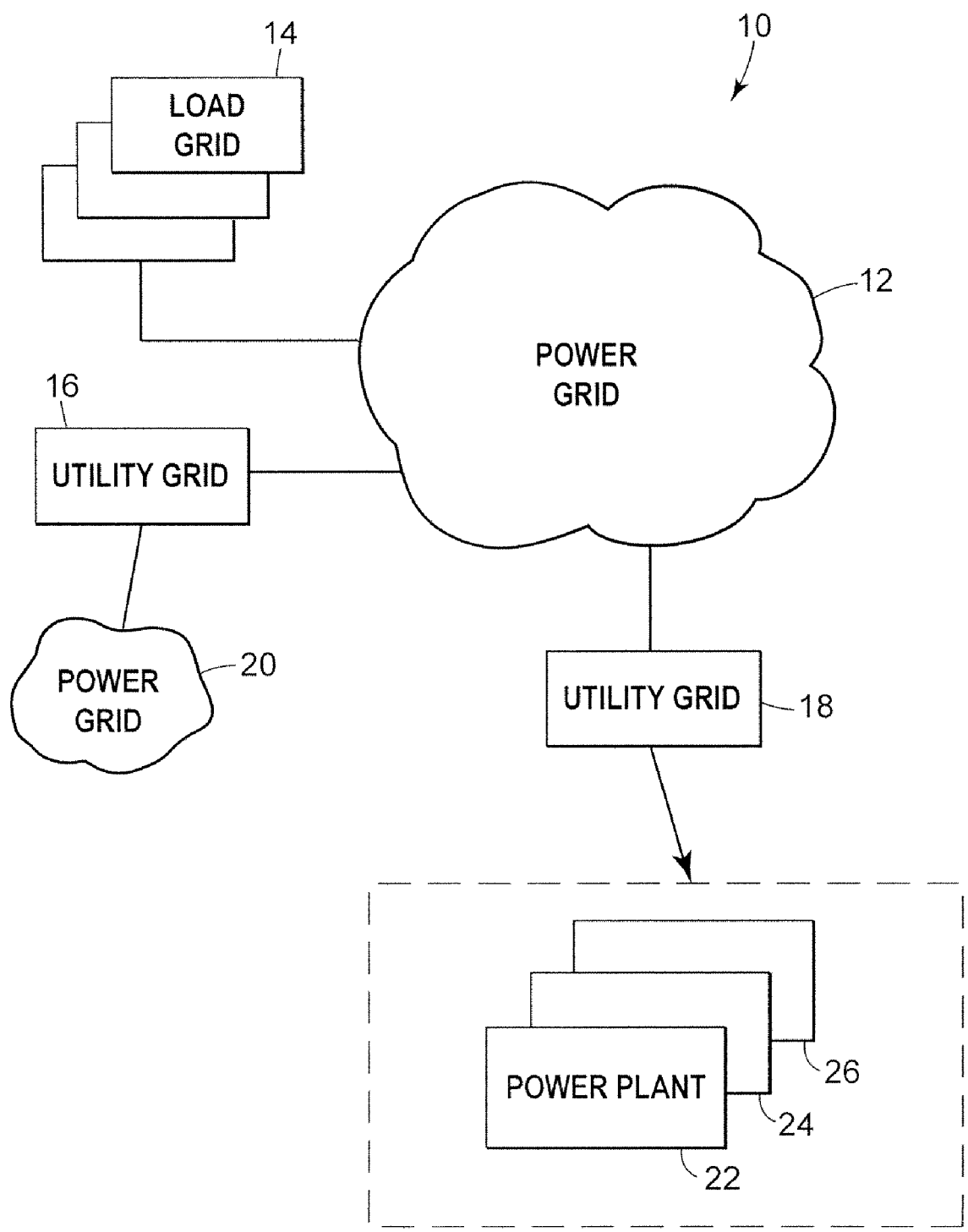
FIG. 1 illustrates a block diagram of a power distribution system.

FIG. 1 illustrates a power distribution system 10 having a power grid 12 connected to a load grid 14. The power grid 12 may transmit both real power, measured in megawatts (MWs) and reactive power, which is a product of the voltage and the out-of-phase component of an alternating current, and is measured in mega volt-amperes reactive (MVARs). The example load grid 14 of FIG. 1 may provide power to various industrial and residential customers who use power consuming devices, such as air conditioning units, electrical motors, lights, appliances, etc. In particular, the load grid 14 may provide real power to devices such as light bulbs, etc., and provide both real power and reactive power to devices such as electric motors, transformers, etc. As a result, it is necessary that the power grid 12 maintains a certain level of real power and reactive power available on the load grid 14 at all times.

As indicated in FIG. 1, the power grid 12 may also be connected to one or more utility grids 16, 18. In this example, the utility grid 16 is connected to a second power grid 20, and the utility grid 18 is illustrated as being formed of one or more power plants 22-26, which may include any of various types of power plants, such as nuclear power plants, hydroelectric power plants, thermal power plants, etc. Additionally, each of the power plants 22-26 may include any number of individual power generators. As discussed above, the operation of the utility grid 18 can be highly complex. As a result, to maintain the utility grid 18 running smoothly, it is necessary that each of the power plants 22-26 be managed with very high precision. Moreover, it is desirable that an operator of the utility grid 18 ensure that the utility grid 18 is able to maintain and provide real power and reactive power at all points throughout the utility grid 18 in a manner that minimizes the total cost of the utility grid 18. To accomplish such an optimal operation, the utility grid 18 may use an economic dispatch program, like the one described herein, which takes into consideration both the real power and the reactive power required on the utility grid 18, the power grid 12 or the load grid 14, to allocate required load demands between the power plants 22-26.

At the plant level, each of the plants 22-26 faces the challenge of operating one or more power generators so that each of the power plants 22-26 can meet its respective power demand with sufficient accuracy as well as at the least possible cost. In this context, an operator of any of the power plants 22-26 may use an economic dispatch program to allocate the required load demands between various power generators. In this manner, an economic dispatch program can be used at various levels within the power distribution system 10, such as at the utility grid level, at the plant level, at a generator level, etc. Irrespective of the level at which an economic dispatch program is used, this program allocates required load demands between various available resources in some optimal manner.

Figure 2:
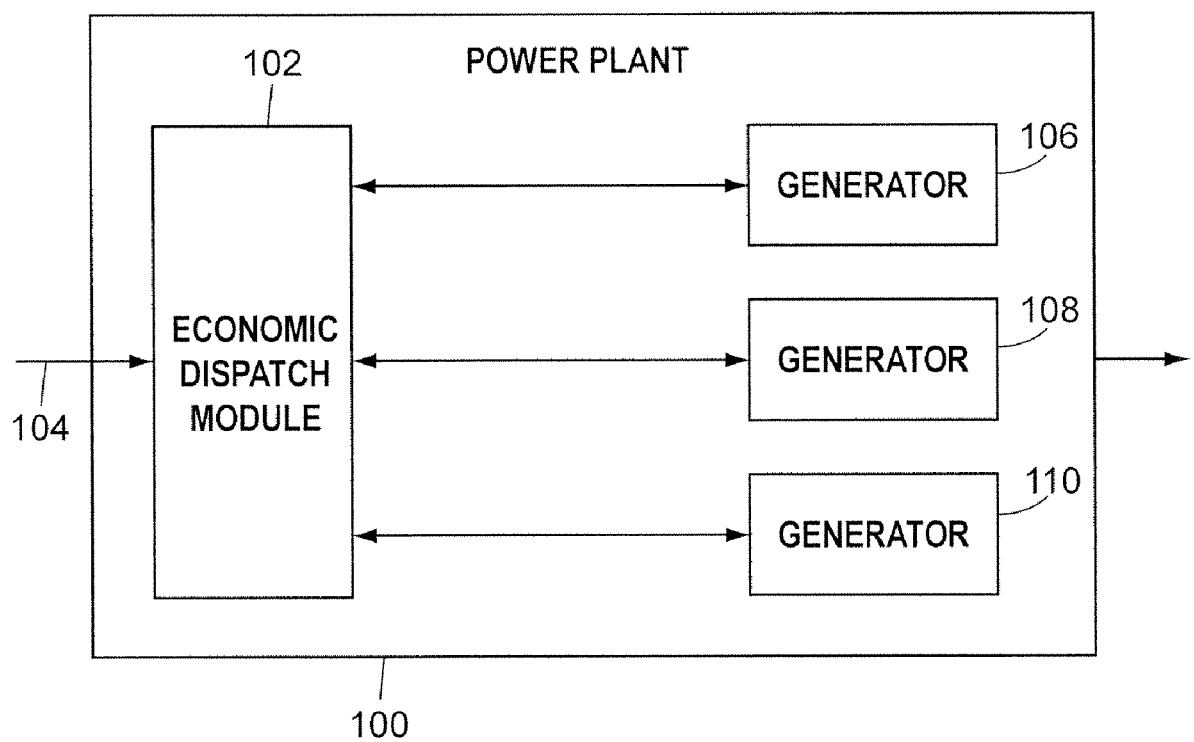
FIG. 2 illustrates a block diagram of a power generation plant.

FIG. 2 illustrates a block diagram of a power plant 100 that may use an economic dispatch module 102 to allocate a load demand 104 among various power generators 106-110. The load demand 104 may specify one or more of the amount of real power to be delivered by the power plant 100, the amount of reactive power to be delivered by the power plant 100, and time and place of the delivery of the real and/or the reactive power. The economic dispatch module 102 may use various information associated with the generators 106-110, such as the availability, the operating condition and the efficiency of each of the generators 106-110, in determining how to best allocate the load demand 104 among the generators 106-110. If desired, the economic dispatch module 102 may be implemented as software stored on a memory of a computer and operable on a controller of the computer, as hardware, as firmware or as any combination thereof.

Figure 3:
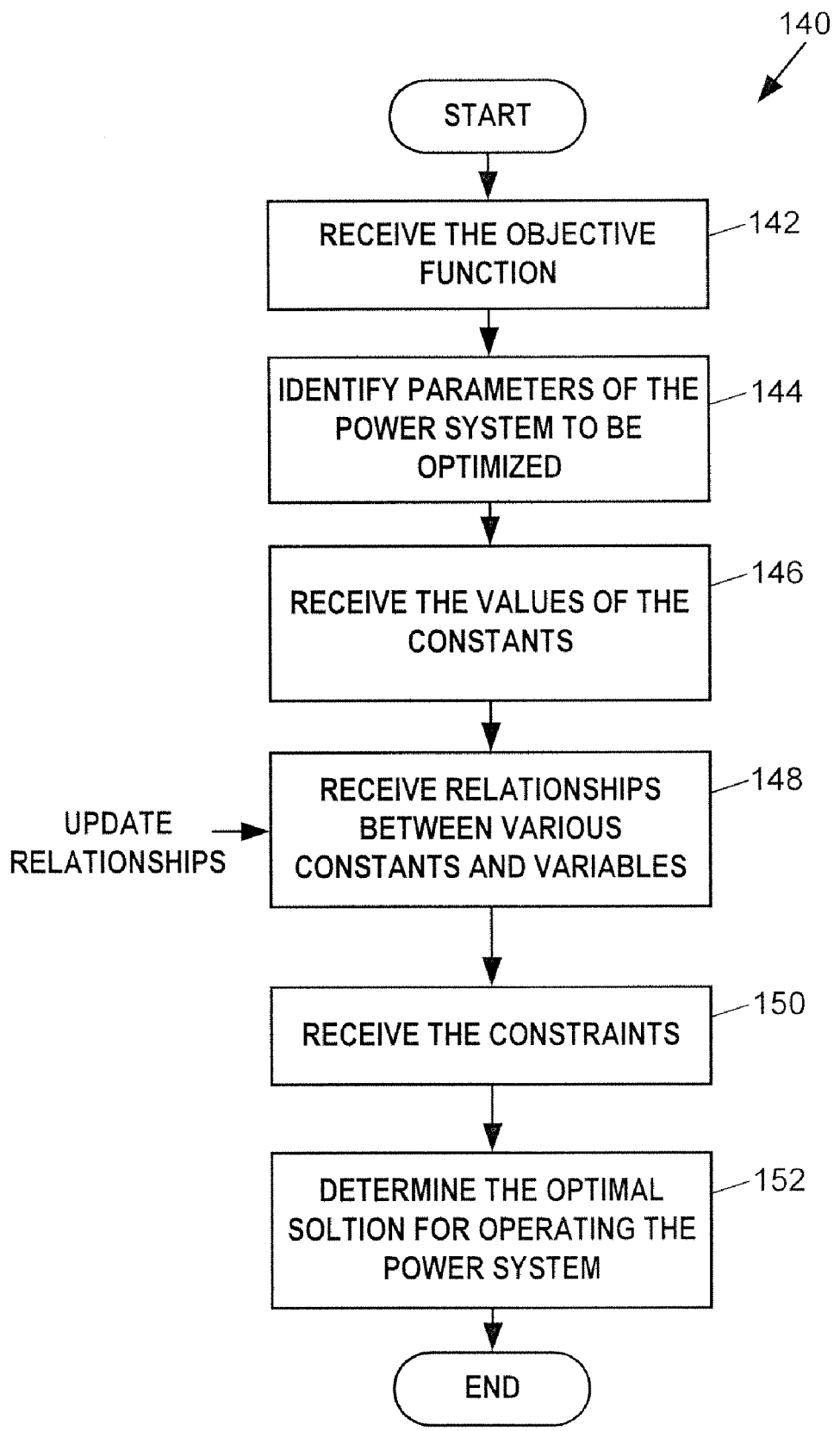
FIG. 3 illustrates a flowchart of an example economic dispatch program used by the power generation plant of FIG. 2.

FIG. 3 illustrates a flow chart of an example economic dispatch program 140 that may be implemented by the economic dispatch module 102. Generally speaking, the economic dispatch program 140 determines the allocation of the load demand 104 among various power generators 106-110 by solving an objective function, which may be provided to the economic dispatch program 140 by the administrator of the power plant 100 to determine an optimal operation point of the plant. To perform such an optimization, the economic dispatch program 140 receives various information about the power plant 100, such as parameters used to define the operation of the plant 100, values of some of these parameters, relationships between these parameters including reactive capability curves of the various generators used in the plant 100, and constraints on the operation of the power plant.

Specifically, a block 142 receives an objective function for the power plant 100, which is to be optimized using the economic dispatch program 140. An example of such an objective function may specify the total cost of producing a given amount of real power and a given amount of reactive power as a function of the amount of fuel necessary to generate the power. In an alternate implementation, the objective function may specify total emissions during production of a given amount of real power and a given amount of reactive power as a function of the amount of emissions per a unit of fuel used in generating the power. Of course, any other desired objective function may be used. The block 142 may receive the objective function in any desired manner, such as in the form of an entry in a spreadsheet stored on the economic dispatch module 102, as a series of selections on a graphical user interface (GUI) based menu presented to the administrator, etc.

Upon receiving the objective function, a block 144 identifies various parameters used to define the operation of the power plant 100. Typically, these parameters are specified or used in the objective function, and the values of one or more of these parameters are varied to find the optimal value of the objective function. Generally speaking, the economic dispatch program 140 treats some of these parameters as constants whose values cannot be altered by the economic dispatch program 140, some of these parameters as controllable or manipulated variables whose values may be controlled by the economic dispatch program 140, and some of these parameters as dependent variables whose values are to be determined by the economic dispatch program 140.

Generally speaking, the objective function of the plant 100 is given as an equation including one or more parameters of the plant 100, wherein values of some of these parameters may be obtained by solving one or more relationships specifying the operation of the plant 100 including relationships specified by the reactive capability curves of the various generators used in the plant 100. The economic dispatch program 140 may determine which parameters are to be treated as constants, as manipulated variables or as dependent variables based on the objective function received by the block 142. The economic dispatch program 140 may also make such determinations using other information about the power plant 100, such as a database file stored in the economic dispatch module 102 wherein the database file has various objects, with each object identifying different equipment within the power plant 100. For example, if the objective function specifies the total cost of operating the power plant 100, the economic dispatch program 140 may treat the cost of fuel, the cold gas generator temperatures, the cold gas generator pressures of the generators 106-110, etc., as constants. In this case, the economic dispatch program 140 may also treat the amount of real power and the amount of reactive power, as specified by the load demand 104, as constants when determining the optimal operating point for the power plant 100.

In an alternate example, if the objective function specifies the total emission of a pollutant gas by the power plant 100, the economic dispatch program 140 may treat the emission of NOx per unit fuel used by the power plant 100 as a constant and the cost of fuel as a controlled variable (value of which may vary based on the type and quality of fuel used). Moreover, even though a given implementation of the economic dispatch program 140 treats a particular parameter as a constant, an alternate implementation of the economic dispatch program 140 may treat that particular parameter as a manipulated variable or as a dependent variable.

Examples of various manipulated variables for the power plant 100 include the rates of fuel flows into the generators 106-110, the operating power factors of the generators 106-110, etc. Generally speaking, manipulated variables are those that can be changed or altered within the plant 100 to specify different operating points of the plant 100. A person of ordinary skill in the art will know that some of the variables treated as manipulated variables within a given implementation of the economic dispatch program 140 may be treated as dependent variables in an alternate implementation of the economic dispatch program 140, while some of the variables treated as dependent variables within a given implementation of the economic dispatch program 140 may be treated as manipulated variables in an alternate implementation of the economic dispatch program 140.

Upon determining which parameters are to be used to define the operation of the power plant 100, a block 146 receives values of the various constants. The economic dispatch program 140 receives values of some of the constants, such as the amount of real power and the amount of reactive power to be produced by the power plant 100, from the load demand 140. Generally, a user may provide values of some of the constants, such as cost of gas used by the generators 106-110, the heating value of the fuel, etc. In an alternate implementation, the economic dispatch module 102 may be communicatively connected to a power plant control system that supplies values for various constants such as the cost of fuel, the cost of NH3, etc., to the economic dispatch program 140. The economic dispatch program 140 may also store the values of the various constants at a periodic rate, in response to an instruction from the user, or based on other predetermined criteria, into a memory of the economic dispatch module 102.

A block 148 determines relationships between the various parameters identified by the block 142, including relationships specified by the reactive capability curves of the generators 106-110. Such relationships may define values of various dependent variables as functions of one or more of the parameters. An example of such a mathematical relationship is a function that defines the value of the heat generated by the generator 106 as a function of the rate of fuel flow in the generator 106 and as a function of the heating value of the gas flowing through the generator 106. Yet another example of such a relationship is a reactive capability curve of the generator 108, which provides the value of reactive power generated by the generator 108 as a function of the cold gas temperature and as a function of the cold gas pressure of the generator 108. Of course, any other known or desirable relationship may be used instead of or in addition to the relationships enumerated herein.

The economic dispatch program 140 may receive the various relationships from a user in the form of a spreadsheet, from a database file stored on the economic dispatch module 102 wherein the database file has various objects, each object identifying an equipment within the power plant 100, etc, or in any other desired manner. Alternatively, a plant control system, which may be communicatively connected to the economic dispatch module 102, may provide one or more such relationships to the economic dispatch program 140. Furthermore, as shown at the block 148 of FIG. 3, the economic dispatch program 140 may update these relationships based on a periodic basis or based on any other predetermined criteria.

Next, a block 150 identifies various constraints on the operation of the power plant 100. An example of a constraint that may be used is that the total reactive power generated by all of the generators 106-110 must be equal to the amount of reactive power required to be produced by the power plant 100, as specified by the load demand 104. Another example of a constraint is that the fuel flow into each of the generators 106-110 cannot be less than zero. The economic dispatch program 140 may receive the various constraints from a user in the form of a spreadsheet, from a database file stored on the economic dispatch module 102 wherein the database file has various objects, each object identifying an equipment within the power plant 100, or in any other manner. Alternatively, a plant control system, which may be communicatively connected to the economic dispatch module 102, may specify one or more such constraints to the economic dispatch program 140

Subsequently, a block 152 determines an optimal solution for the operation of the power plant 100 by solving the various relationships to obtain an optimal solution of the objective function received by the block 142. In determining the optimal solution, the economic dispatch program 140 generally uses the values of the various parameters as identified by the block 144, the values of the constants as determined by the block 146, the relationships among the various parameters as defined by the block 148, the constraints as identified by the block 150. In particular, the economic dispatch program 140 varies the manipulated variables in some systematic manner to identify a set of dependent variable values which result into an optimal value for the objective function.

Figure 4:
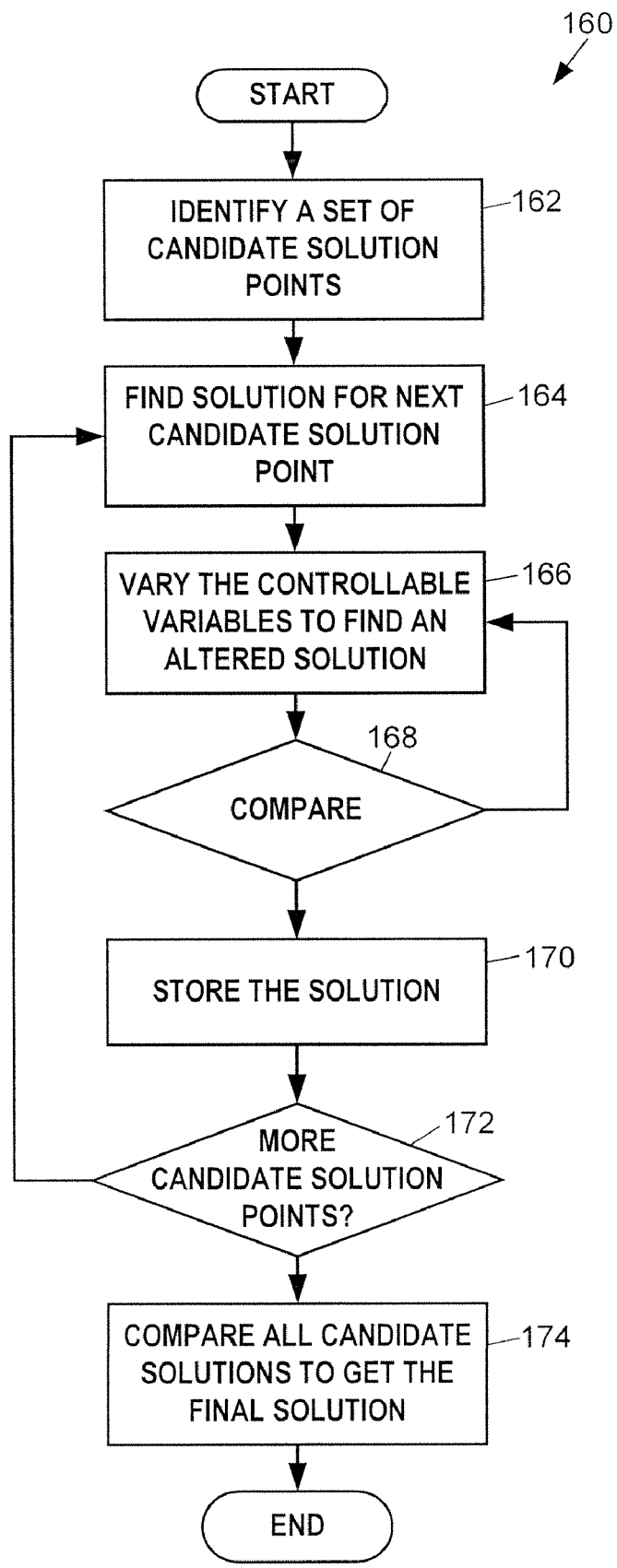
FIG. 4 illustrates a flowchart of an example mathematical solver used by the economic dispatch program of FIG. 3.

FIG. 4 illustrates a flowchart of a program (generally known as solver) 160 that may be used to solve the objective function of the power plant 100 subject to the various constraints of the power plant 100. The example solver 160 determines the optimal solution for the objective function by using an iterative algorithm, generally known as the evolutionary algorithm, wherein a set of candidate solution points within the constraints are selected, a set of localized solutions corresponding to the set of candidate solution points is obtained and one of the set of localized solutions is selected as the optimal solution of the objective function.

Specifically, a block 162 identifies a set of candidate solution points for the objective function, wherein each of the candidate solution points is determined by a set of manipulated variables defining an operating point for the power plant 100. The block 162 may determine the set of candidate solution points by analyzing data regarding past operation of the power plant 100, by obtaining these solution points from a model or a user, etc. If desired, such data may be stored in a database located on the economic dispatch module 102.

A block 164 solves the objective function for one of the set of candidate solution points and stores an initial value of the objective function. During the solving process, the block 164 uses one or more of the relationships identified by the block 148 to determine values of the various dependent variables at the one of the set of candidate solution points. The block 164 then solves the objective function using these dependent variables, the constants and the manipulated variables defined by the selected set of candidate solution points, checks to determine if the values of the various dependent variables are within the constraints identified by the block 150, and, if not, limits these values to the constraints.

Subsequently, a block 166 changes values of one or more of the controlled variables based on some predetermined criteria and solves the objective function to determine an altered value of the objective function. The solver 160 may determine the direction and the amount of the change to be made to the controlled variables based on predetermined criteria which may be specified by the administrator of the power plant 100 or which may be determined randomly, pseudo-randomly, or in some predetermined or iterative manner.

A block 168 compares the initial value of the objective function and the altered value of the objective function to determine which value is more optimal, the direction in which the value of the objective function has changed and the amount by which the value of the objective function has changed. Based on the result of the comparison, the block 168 may determine whether the values of the manipulated variables are to be further altered or not, and if the values are to be further altered, in which direction and by how much. In this manner, the blocks 166 and 168 operate together to iteratively alter the values of the manipulated variables until the block 168 determines that the resulting value of the objective function is an optimal value of the objective function in the vicinity of the one of the set of candidate solution points, also known as a localized optimal solution.

Once the localized optimal solution is obtained, a block 170 stores the localized optimal solution as one of a set of localized optimal solutions for the objective function. Subsequently, a block 172 determines if there are any more candidate solution points in the set of candidate solution points for which localized optimal solutions are to be obtained. If so, the control is transferred back to the block 164 to find another localized optimal solution for the next of the set of candidate solution points. If the block 172 determines that a localized optimal solution for each of the set of candidate solution points has been found, it passes control to a block 174, which compares the values of the objective function at each of the set of localized optimal solutions and determines the most optimal solution for the objective function. The implementation of the solver 160 as described above ensures that even if the objective function of the power plant 100 has multiple localized optimal values, the most optimal of these localized optimal values is obtained.

The solver 160 may be implemented in the form of software, hardware, firmware or any combination thereof. For example, the solver 160 may be implemented using one of the various off-the-shelf mathematical solution programs, such as the Evolutionary Solvers program available from Frontline Systems, Inc.

Figure 5:
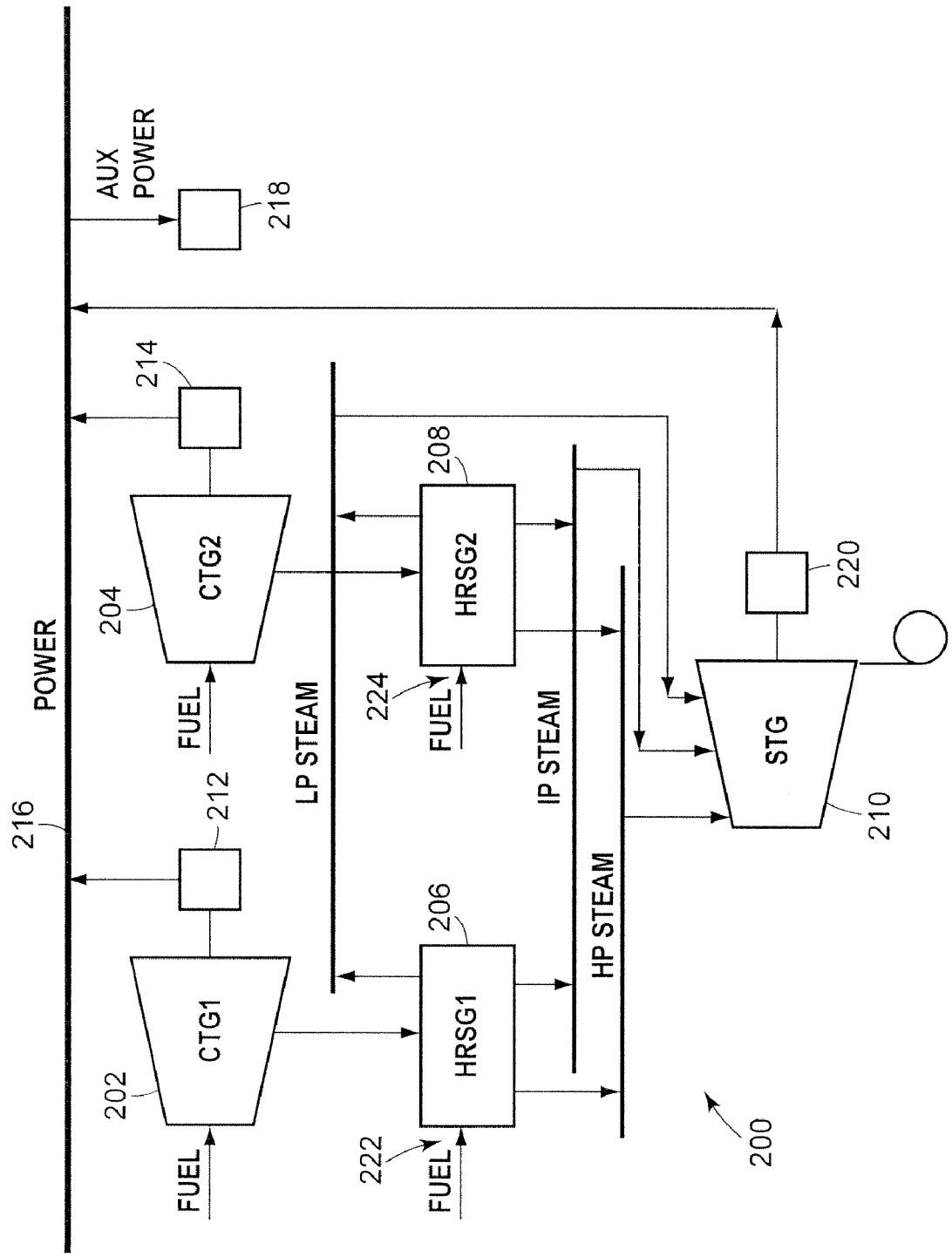
FIG. 5 illustrates a block diagram of an electric power plant using thermal power generators.
Figure 6:
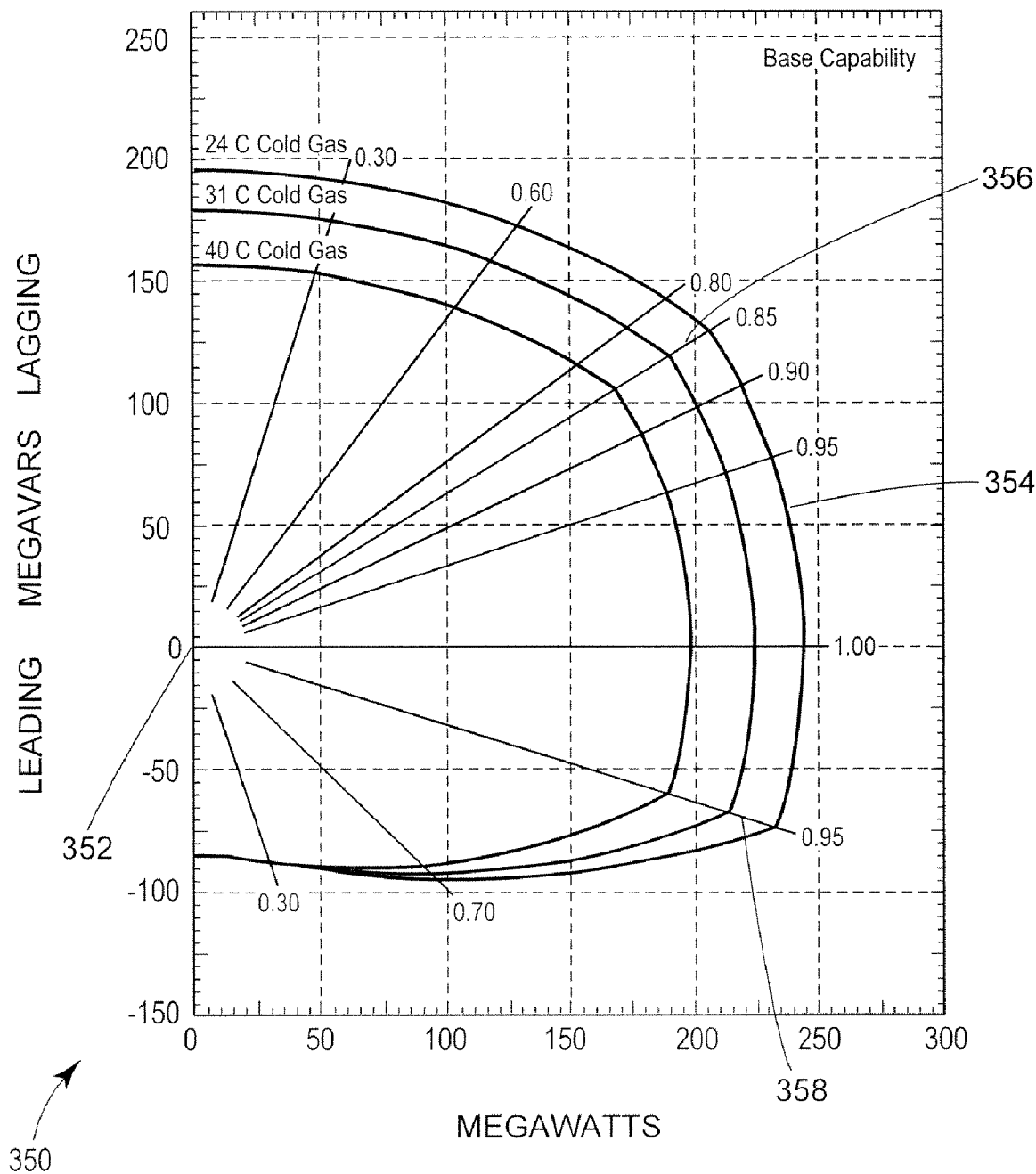
FIG. 6 illustrates an estimated reactive capability curve of a combustion turbo-generator.
Figure 7:
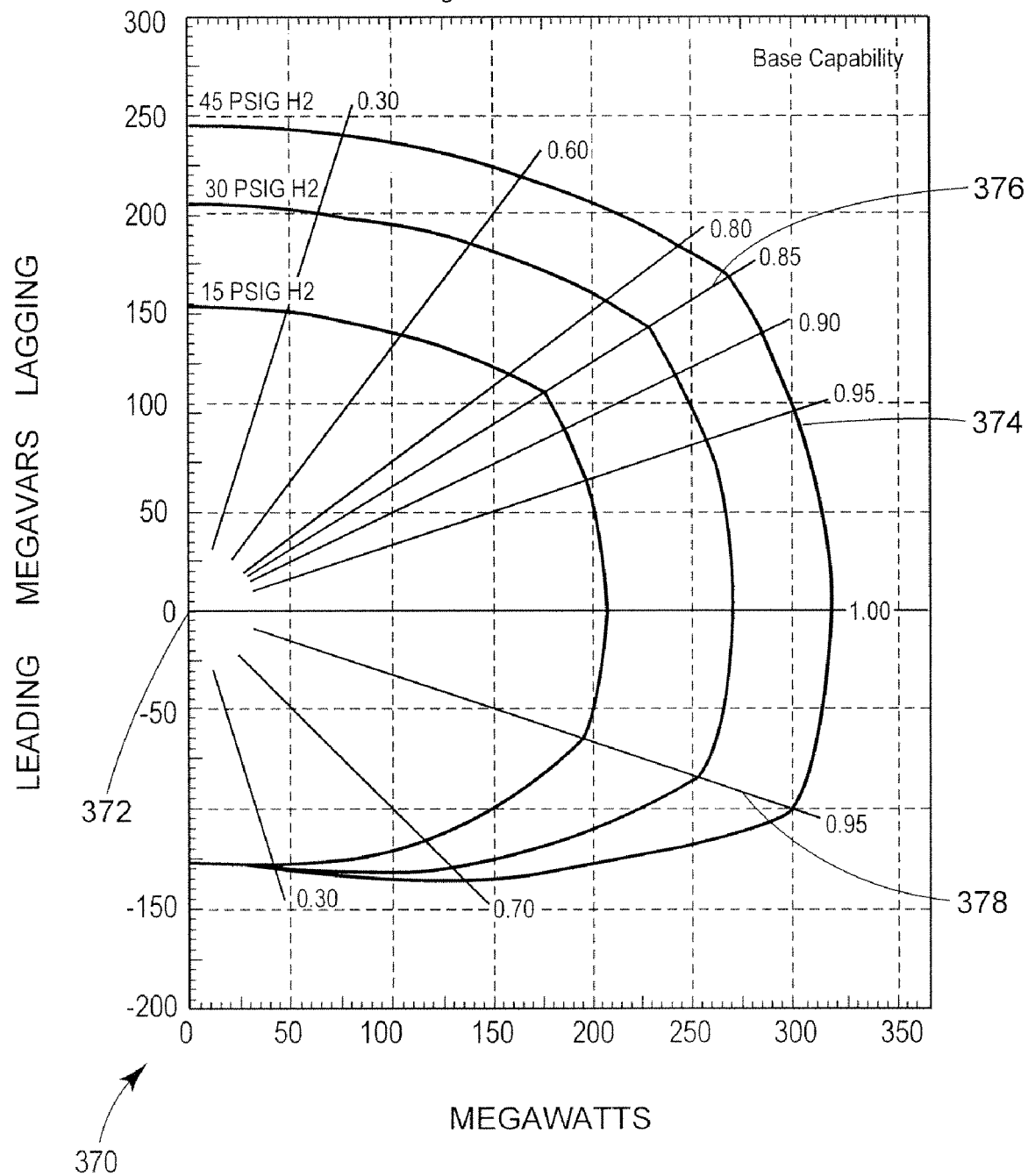
FIG. 7 illustrates an estimated reactive capability curve of a steam turbine generator.

While the above implementation of the economic dispatch program 140 is described in the context of the generic power plant 100, FIGS. 5-7 illustrate the functioning of the economic dispatch program 140 in the context of a thermal power plant 200. In particular, the power plant 200 illustrated in FIG. 5 is a thermal power plant designed as a combined cycle power plant (CCPP) that can also be operated as a simple cycle power plant. As indicated in FIG. 5, a typical CCPP may have several combustion turbo-generators (CTGs) 202 and 204, each with a corresponding heat recovery steam generator (HRSG) 206 and 208 and a common steam turbo-generator (STG) 210. The CTGs 202 and 204, which receive fuels such as natural gas, along with compressed air into their combustion sections have two primary functions. Firstly, the CTGs 202 and 204 produce electrical power through hydrogen cooled generators 212 and 214, which are directly connected to the CTGs 202 and 204. Secondly, the CTGs 202 and 204 supply hot gases to the HRSGs 206 and 208. The electrical power generated by the generators 212 and 214 is uploaded to the plant power grid 216, which may be ultimately connected to the utility grid 18 of FIG. 1. The plant power grid 216 may also be connected to an auxiliary power grid 218, where the auxiliary power grid 218 provides real power and/or reactive power to the plant power grid 216 according to the total power needed to be placed on the plant power grid 216.

Operating the plant 200 in the CCPP mode, in which the HRSGs 206 and 208 are used along with the CTGs 202 and 204, is economically efficient due to the HRSGs 206 and 208 capturing and using the exhaust energy of the CTGs 202 and 204 for additional power generation. However, it is also possible to operate the CTGs 202 and 204 without the HRSGs 206 and 208, which is known as a simple cycle mode operation but which is less efficient than the CCPP mode. Of course, whether the plant 200 is operated in the CCPP mode or in the simple cycle mode, the HRSGs 206 and 208 run only when the CTGs 202 and 204 are used.

The HRSGs 206 and 208, which form a link between the CTGs 202 and 204 and the STG 210, receive a supply of hot gases from the CTGs 202 and 204 as well as a fuel such as natural gas from a fuel source (not shown). The HRSGs 206 and 208 use the hot gases and the fuel to generate steam for the STG 210 and, as illustrated in FIG. 5, provide the steam to the STG 210 at three different pressure levels, namely a low pressure (LP) level, an intermediate pressure (IP) level and a high pressure (HP) level. Using the pressurized steam, the STG 210 produces electric power through a hydrogen cooled generator 220, wherein the electric power generated by the generator 220 is uploaded to the plant power grid 216.

When a power plant operates in the CCPP mode, in which the HRSGs 206 and 208 are placed downstream from CTGs 202 and 204, duct burners 222 and 224 are typically placed in the inlet paths of the HRSGs 206 and 208. The duct burners 222 and 224 are only used when the power plant 200 cannot satisfy the total power demand running only the CTGs 202 and 204, which typically occurs on hot days when the maximum power that can be generated by the CTGs 202 and 204 is limited. When the duct burners 222 and 224 are used, the additional gas burned in the duct burners 222 and 224 causes the amount of steam produced by the HRSGs 206 and 208 to increase, thus making more steam available for use in the STG 210 and thereby increasing the power produced by the STG 210. Therefore, when determining the operating parameters of the plant 200 for the optimal production of power, it is desirable to take into consideration whether or not the duct burners 222 and 224 are to be used.

The power plant 200 can output a specified combination of real power and reactive power using a number of different combinations of the generators 202, 204 and 210 and the duct burners 222 and 224. Furthermore, each of the generators 202, 204 and 210 and the duct burners 222 and 224 has a variety of operational settings, so that a number of different combinations of operational settings can be used to satisfy a given load demand. As a result, determining an optimal combination of the operational settings of the various equipment used in the plant 200 can be a highly complex task. An application of the economic dispatch program 140 of FIG. 3 to determine the optimal operational settings for the various equipment used in the power plant 200, taking into account production of both real power and reactive power is described as follows.

The block 142 of FIG. 3 receives the objective function for the power plant 200. When the goal of the economic dispatch program 140 is to minimize the operating cost of running the power plant 200, the objective function of the power plant 200 can be provided as follows:

Minimize (G1_HEAT*GAS_COST+
G2_HEAT*GAS_COST+
DB1_HEAT*GAS_COST
+DB2_HEAT*GAS_COST)

Various parameters used in this objective function are explained below in Table 1.

TABLE 1

CONSTANTS

| | |
|---|---|
| GAS_COST | Cost of gas used as fuel in the power plant 200 |
| HEAT_VAL | Heating value of gas used as fuel in the power plant 200 |
| MW_DMD | Plant MW demand |
| MVAR_DMD | Plant MVAR demand |
| G1_CIT | CTG 1 compressor inlet temperature |
| G2_CIT | CTG 2 compressor inlet temperature |
| G1_EXT | CTG1 exhaust gas temperature |
| G2_EXT | CTG2 exhaust gas temperature |
| G1_CGT | CTG1 cold gas Generator temperature |
| G2_CGT | CTG2 cold gas Generator temperature |
| G1_CGP | CTG1 cold gas Generator pressure |
| G2_CGP | CTG2 cold gas Generator pressure |
| STG_CGT | STG cold gas Generator temperature |
| STG_CGP | STG cold gas Generator pressure |
| MANIPULATED VARIABLES | |
| G1_FF | CTG1 fuel flow |
| G1_PF | CTG1 power factor |
| G2_FF | CTG2 fuel flow |
| G2_PF | CTG2 power factor |
| STG_PF | STG power factor |
| DB1_FF | Duct Burner 1 fuel flow |
| DB2_FF | Duct Burner 2 fuel flow |
| G1_ON | Binary switch if set turn CTG1 ON; 0 - turn OFF |

TABLE 1-continued

| | |
|---|---|
| G2_ON | Binary switch if set turn CTG2 ON; 0 - turn OFF |
| STG_ON | Binary switch if set turn STG ON; 0 - turn OFF |
| DB1_ON | Binary switch if set turn DB1 ON; 0 - turn OFF |
| DB2_ON | Binary switch if set turn DB2 ON; 0 - turn OFF |
| DEPENDENT VARIABLES | |
| G1_HEAT | The heat into CTG1 from the fuel. |
| G2_HEAT | The heat into CTG2 from the fuel. |
| DB1_HEAT | The heat into HRSG1 from the Duct Burner fuel. |
| DB2_HEAT | The heat into HRSG2 from the Duct Burner fuel. |
| HP1_STM | Amount of High Pressure steam from HRSG1 |
| HR1_STM | Amount of Hot Reheat steam from HRSG1 |
| LP1_STM | Amount of Low Pressure steam from HRSG1 |
| HP2_STM | Amount of High Pressure steam from HRSG2 |
| HR2_STM | Amount of Hot Reheat steam from HRSG2 |
| LP2_STM | Amount of Low Pressure steam from HRSG2 |
| STG_HP | Amount of High Pressure steam entering the STG |
| STG_HR | Amount of Hot Reheat steam entering the STG |
| STG_LP | Amount of LP steam entering the STG |
| G1_MW | CTG1 MW amount |
| G1_MVAR | CTG1 MVAR amount |
| G2_MW | CTG2 MW amount |
| G2_MVAR | CTG2 MVAR amount |
| STG_MW | STG MW amount |
| STG_MVAR | STG MVAR amount |
| AUX_MW | Plant Auxiliary MW |

The block 144 of FIG. 3 identifies various parameters of the power plant 200, which may be used in determining the optimal operational settings for the power plant 200. To perform this function, the block 144 of FIG. 3 may present a menu and/or use a graphical user interface (GUI) based program to receive input from the administrator of the plant 200.

Next, the block 146 of FIG. 3 determines the values of the various constants listed in the Table 1. The block 146 may obtain the values of one or more of these constants from a database stored on the economic dispatch module 102. Alternatively, to obtain the values of one or more of these constants, the block 146 may present a menu and/or use a graphical user interface (GUI) based program to receive input from the administrator of the plant 200. In yet another implementation, a plant control system, which may be communicatively connected to the power plant 200, may provide values of one or more of the various constants listed in Table 1.

Thereafter, the block 148 of FIG. 3 determines the relationships between the various parameters of the power plant 200. Examples of some of the relations between the various parameters of the power plant 200, which may be stored on the memory of the economic dispatch module 102, are listed below in Table 2 as equations 1-20.

TABLE 2

1  G1_HEAT = (G1_FF*HEAT_VAL)/1000
2  G2_HEAT = (G2_FF*HEAT_VAL)/1000
3  DB1_HEAT = (DB1_FF*HEAT_VAL)/1000
4  DB2_HEAT = (DB2_FF*HEAT_VAL)/1000
5  HP1_STM = F (G1_HEAT, G1_EXT, DB1_HEAT)
6  HR1_STM = F (G1_HEAT, G1_EXT, DB1_HEAT)
7  LP1_STM = F (G1_HEAT, G1_EXT, DB1_HEAT)
8  HP2_STM = F (G2_HEAT, G2_EXT, DB2_HEAT)
9  HR2_STM = F (G2_HEAT, G2_EXT, DB2_HEAT)
10 LP2_STM = F (G2_HEAT, G2_EXT, DB2_HEAT)
11 STG_HP = HP1_STM + HP2_STM
12 STG_HR = HR1_STM + HR2_STM

TABLE 2-continued

```
13  STG_LP = LP1_STM + LP2_STM
14  G1_MW = F(G1_HEAT, G1_CIT, G1_CGT, G1_CGP, G1_PF)
15  G1_MVAR = F(G1_HEAT, G1_CIT, G1_CGT, G1_CGP, G1_PF)
16  G2_MW = F(G2_HEAT, G2_CIT, G2_CGT, G2_CGP, G2_PF)
17  G2_MVAR = F(G2_HEAT, G2_CIT, G2_CGT, G2_CGP, G2_PF)
18  STG_MW = F(STG_HP, STG_HR, STG_LP, STG_CGT, STG_CGP, STG_PF)
19  STG_MVAR = F(STG_HP, STG_HR, STG_LP, STG_CGT, STG_CGP, STG_PF)
20  AUX_MW = F(G1_MW + G2_MW + STG_MW)
```

While the equations 1-13 listed above enumerate linear relationships between the various parameters of the power plant 200, the equations 14-20 are non-linear functions, of which the equations 14-19 represent the reactive capability curves of one or more of the CTGs 202 and 204 and the STG 210. In one implementation, the equations 14-19 may capture the reactive capability curves of the CTGs 202 and 204 and the STG 210, and represent neural network models used to define values of the real power and the reactive power generated by the CTGs 202 and 204 and the STG 210 as a function of the parameters included within the brackets on the right hand side of these equations.

Specifically, the equations 15-17 of Table 2 represent the reactive capability curves of the CTGs 202 and 204, and are illustrated in FIG. 6 by an estimated reactive capability curve 350 that defines the limits imposed on the real power and the reactive power of a particular CTG at various power factors, generator temperatures, and generator pressures. In FIG. 6, the real power of the CTG is plotted as the abscissa and the reactive power of the CTG is plotted as the ordinate. The curve 350 depicts, for example, that for a cold gas temperature of 24° centigrade and a cold gas pressure of 30.00 PSIG, the optimal operating range of that particular CTG is limited to a region defined between the origin 352, an arc 354, a first line 356 corresponding to the power factor of 0.85 and a second line 358 corresponding to the power factor of −0.95. While the total power (MVA) produced by that particular CTG is the same at each point on any arc within this optimal operating range, where the center of such arc is the origin, such as the arc 354, for points outside the range, the MVA produced by that particular CTG starts to decline due to heat build-up within the CTG.

The equations 18-19 of Table 2 represent the reactive capability curves of the STG 210, and are illustrated in FIG. 7 by an estimated reactive capability curve 370 that defines the limits imposed on the real power and the reactive power of a particular STG at various power factors, generator temperatures, and generator pressures. In FIG. 7, the real power of the STG is plotted as the abscissa and the reactive power of the STG is plotted as the ordinate. The curve 370 depicts, for example, that for a cold gas temperature of 42° centigrade and a cold gas pressure of 45 PSIG, the optimal operating range of that particular STG is limited to a region defined between the origin 372, an arc 374, a first line 376 corresponding to the power factor of 0.85 and a second line 378 corresponding to the power factor of −0.95. While the MVA produced by that particular STG is the same at each point on any arc within this optimal operating range, where the center of such arc is the origin, such as the arc 374, for points outside the range, the MVA produced by the STG starts to decline due to heat build-up within that particular STG.

Generally, the estimated reactive capability curves for generators such as the CTGs 202 and 204 and the STG 210 are provided by the manufacturer of these generators. As the reactive capability curves of the generators 202, 204 and 210 provide operating ranges of these generators, if the values of the generator gas temperature and gas pressures in these generators are available, the reactive capability curves of these generators can be used by the economic dispatch program 140 in determining one or more operating points for the power plant 200. However, in practice, the reactive capability curves of any generators are not steady, and they change over time with use of the generators.

In these circumstances, to obtain the optimal value of the objective function of the power plant 200, the economic dispatch program 140 may approximate the functions describing the actual reactive capability curves for the power plant 200 (e.g., functions 14-19 of Table 2). The economic dispatch program 140 may use techniques, such as neural networks, curve fitting with interpolation, etc. for approximating these functions. An implementation of the neural network approximation technique employed by the economic dispatch program 140 may involve operating the generators 202, 204 and 210 at various points of gas pressure and gas temperatures and recording various actual observations of the real power and reactive power of these generators (also known as training the neural network). Subsequently, the trained neural network may be substituted for the functions 14-19 and used in obtaining the optimal value of the objective function of the power plant 200. The economic dispatch program 140 may continuously or periodically update the neural network based on real time data provided by a control system of the power plant 200 and use the updated neural network in obtaining the optimal value of the objective function of the power plant 200.

Once the economic dispatch program 140 has determined various relationships for the power plant 200, the block 150 of FIG. 3 identifies the constraints applicable to the power plant 200, an example of which are listed below in Table 3.

TABLE 3

CONSTRAINTS

```
G1_MW + G2_MW + STG_MW − AUX_MW = MW_DMD
G1_MVAR + G2_MVAR + STG_MVAR = MVAR_DMD
G1_FF >= 0
G1_FF <= F(G1_CIT)
G2_FF >= 0
G2_FF <= F(G2_CIT)
G1_PF >= 0
G1_PF <= 1
G2_PF >= 0
G2_PF <= 1
STG_PF >= 0
STG_PF <= 1
DB1_FF >= 0
```

Having determined the objective function of the power plant 200, the various relationships between the parameters of the power plant 200, and the constraints of the power plant 200, the block 152 determines one or more optimal operational solutions for the power plant 200 using the solver 160 of FIG. 4.

One of the advantages of using the reactive capability curves, such as the capability curves 350 and 370, or some model that approximates these curves, for determining an optimal operational solution for the power plant 200 is that these curves allow incorporating the limits imposed on the real power and the reactive power generated by each of the generators 202, 204 and 210. In this manner, the economic dispatch program 140 can use the values of the real power and the reactive power as defined by the load demand on the plant grid 216 and determine the optimal operating point for each of the generators 202, 204 and 210.

Of course, while the application of the economic dispatch program 140 to the power plant 200 minimizes the cost of operating the power plant 200, in an alternate situation, the economic dispatch program 140 can be applied to the power plant 200 to meet an alternate objective, which may be for example, the minimization of NOx emissions, or some optimal combination of the two. In an alternative implementation, the economic dispatch program 140 may be applied to the entire utility grid 18 to allocate the total demand of the utility grid 18 among the power plants 22-26 so that the total cost of the operating the utility grid 18 is minimized. In yet another alternate implementation, the economic dispatch program 140 may be applied to the entire power grid 12 to allocate the total demand of the power grid 12 among the utility grids 16, 18, etc., so that the total cost of operating the power grid 12 is minimized.

The estimated reactive capability curves 350 and 370 of FIGS. 6 and 7, respectively, are generally provided by the manufacturer of the generators and they provide the estimated behavior of the generators at the time of the initial installation of such generators. As the generators are used, over time the actual reactive capability curves of the generators may deviate from the estimated reactive capability curves 350 and 370.

Figure 8:
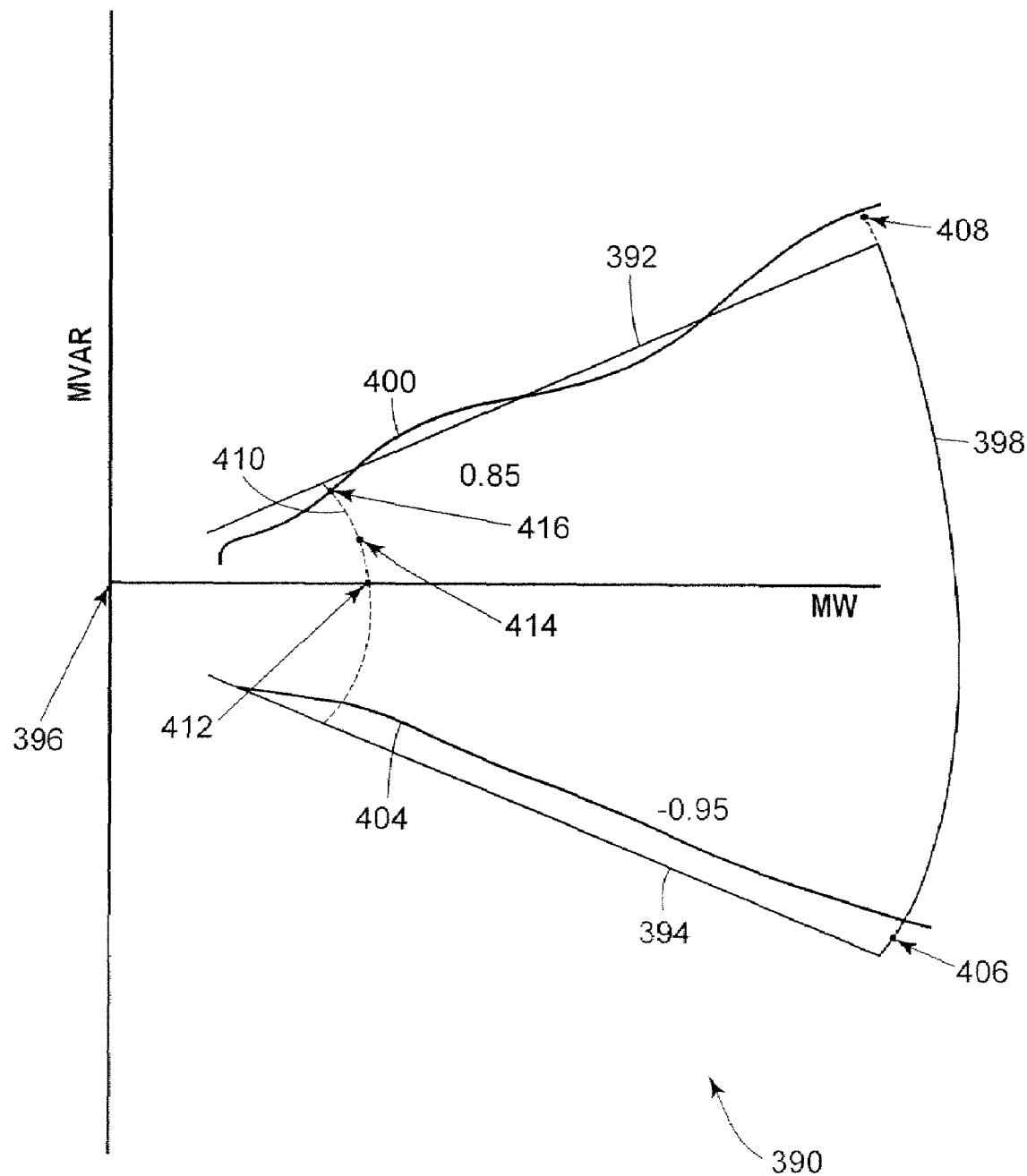
FIG. 8 illustrates an actual reactive capability curve of a typical generator.

FIG. 8 provides an example of an actual reactive capability curve 390 that may specify the optimal operating range of a particular generator, such as the generator 106. The estimated optimal operating range of the generator 106, as shown in the FIG. 8, is limited by an estimated upper limit 392 having a lagging power factor of 0.85 and an estimated lower limit 394 having a leading power factor of −0.95. The estimated upper limit 392 and the estimated lower limit 394 may be provided by the manufacturer of the generator 106.

The optimal operating range of the generator 106 is also characterized by the generator 106 operating with constant armature current, whereas outside the optimal operating range, the generator 106 operates with constant field current. Various points on the reactive capability curve 390 having the same total MVA can be shown by an arc that is limited by the estimated upper limit 392 and the estimated lower limit 394. An example of such an arc having equal MVA at all points is an arc 398. Specifically, the arc 398 may be represented by an equation of a circle with the origin 396 as its center, wherein the origin 396 represents zero total MVA. In an ideal situation, the total MVA produced by the generator 106 on each point of the arc 398, between the estimated upper limit 392 and the estimated lower limit 394, will be the same. For power factors outside the optimal operating range, i.e., for lagging power factors lower than 0.85 (i.e., for power factors from 0.85 to 0) or for leading power factors higher than −0.95 (i.e., for power factors from −0.95 to 0), any point on an arc denoted by the same equation as that of the arc 398 would have a total MVA lower than the total MVA between the estimated upper limit 392 and the estimated lower limit 394.

In actual operating conditions, the optimal operating range of the generator 106 may have changed. As a result, the actual lines denoting the upper limit and the lower limit of the optimal operating range of the generator 106 may also have shifted. For example, the actual upper limit of the actual optimal operating range of the generator 106 may have shifted from the estimated upper limit 392 to an actual upper limit 400. Similarly, the actual lower limit of the actual optimal operating range of the generator 106 may have shifted from the estimated lower limit 394 to an actual lower limit 404.

In this situation not every operating point on the arc 398 represents an optimal operating point for the generator 106. For example, an operating point 406, which would have been an optimal operating point if the estimated lower limit 394 had not deviated to the actual lower limit 404, is now a non-optimal operating point. Therefore, the total MVA of the generator 106 at the point 406 may be lower than the total MVA at any other point on the arc 398 between the actual upper limit 400 and the actual lower limit 404. Similarly, due to the shift of the estimated upper limit 392 to the actual upper limit 400, a point 408, which was not an optimal point before the shift, may now become an optimal operating point. Therefore, while before the shift the total MVA at the operating point 408 may have been lower than at other points on the arc 398, after the shift, the total MVA at the operating point 408 may be same as the total MVA at the other points on the arc 398.

To ensure that the generator 106 is always operated efficiently, it is advantageous to determine the actual optimal operating range of the generator 106 as denoted by the actual upper limit 400 and the actual lower limit 404. To determine such limits, as illustrated below a program captures actual operating data related to operation of the generator 106, and represents the reactive capability curve 390 of the generator 106 by a neural network. Alternatively, the reactive capability curve 390 may also be generated by performing multiple regression analysis on the actual operating data or by applying a data mining technique, a polynomial fitting technique, a spline analysis technique, a wavelet analysis technique, a genetic/evolutionary algorithm or any other well known data analysis technique, to the actual operating data. The actual operating data captured by such a program may include the temperature, pressure, MVA, MW, etc., and the neural network model may be periodically updated using the captured data. A program 450, as illustrated below in FIG. 9 uses the updated neural network model of the generator 106 to find the optimal operating range of the generator 106.

The program 450 may be implemented as part of a control system used to control the operation of the generator 106. The program 450 calculates a heat input for a low load level of the generator, such as a first load level being at 25% of the full capacity load level, and then calculates the MVA at a power factor of 1. Subsequently, the program 450 gradually varies the power factor and calculates the total MVA of the generator 106 at various power factor levels. At each power factor level, the program 450 determines and analyzes the change in the total MVA to see the impact of changing of the power factor on the total MVA of the generator 106.

Using the data related to the impact of change in the power factor on the total MVA of the generator 106, the program 450 determines the actual optimal operating range of the generator 106 at the first load level. Subsequently, the program 450 increases the load level to a second load level and determines the actual optimal operating range of the generator 106 at the second load level. The program 450 may continue increasing the load level until it reaches a maximum load level to determine optimal operating range of the generator 106 at different load levels.

Figure 9:
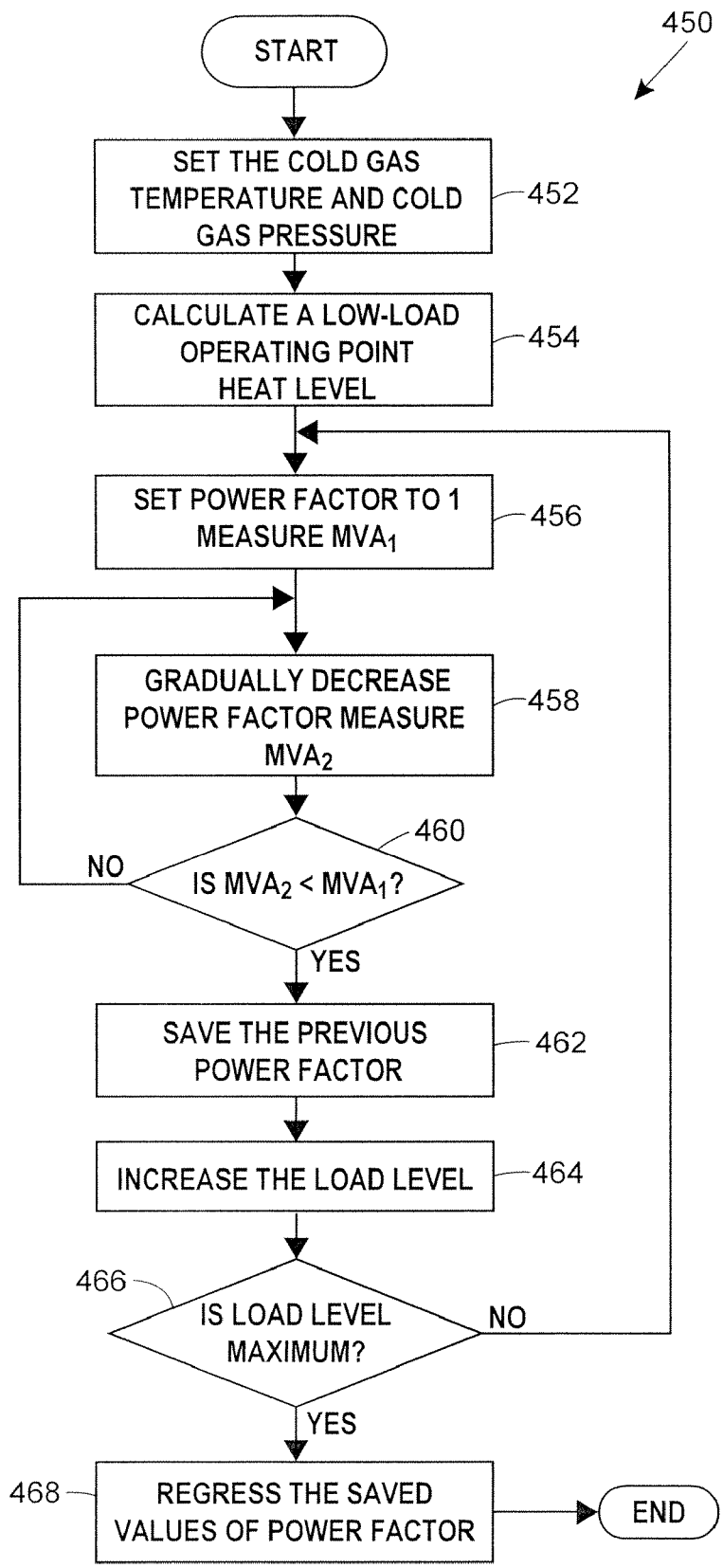
FIG. 9 illustrates a flowchart of a program to determine the actual reactive capability curve of a generator.

Now referring to FIG. 9, a block 452 sets the cold gas temperature and cold gas pressure of the generator 106 at predetermined levels. Such predetermined levels for operating the generator 106 may be selected based on operating levels specified by the manufacturer of the generator 106. As is known to those of ordinary skill in the art, the reactive capability curves of a particular power generator varies depending on the cold gas temperature and cold gas pressure of that particular power generator.

A block 454 calculates a heat input level required to operate the generator at a first low load operating point. For example, the block 454 may set the first low load operating point of the generator to a twenty five percent of the estimated maximum load capacity level. An arc representing an operation of the generator 106 at the first low load level, such as at a twenty five percent operating level is illustrated in FIG. 8 by an arc 410. In ideal conditions, at each point on the arc 410 between the estimated upper limit 392 and the estimated lower limit 394, the total MVA of the generator 106 will be constant and optimal.

Subsequently, a block 456 sets the power factor of the generator 106 to one, that is at an operating point where the total MVA or the generator 106 comprises only real power (MW). In FIG. 8, such an operating point on the arc 410 is illustrated by a point 412 on the abscissa. Note that while in this implementation of the program 450, the initial power factor level is set at one, in an alternate implementation, the initial power factor level may be set to be equal to some other point as desired by a user of the program 450. After setting the initial power factor level at one, the block 456 calculates the total MVA of the generator 106, which is denoted here as $MVA_1$.

After calculating the total MVA at power level one, a block 458 gradually decreases the power factor to a level lower than one. In the example program 450 illustrated here, the block 458 gradually decreases the power factor in a manner so that the reactive power (MVAR) of the generator 106 is lagging the real power (MWA) of the generator 106, i.e., the generator 106 is still operated with a lagging power factor. For example, the new operating point of the generator 106 with lagging power factor lower than one is denoted by a point 414 on FIG. 8. The block 458 calculates the total MVA of the generator 106 at the operating point 414, which is denoted by $MVA_2$.

Subsequently, a block 460 compares $MVA_1$, the total MVA at the initial operating point 412 and $MVA_2$, the total MVA at the second operating point 414. Ideally, if the second operating point 414 is still within the optimal operating range of the generator 106, as defined by the upper limit 392 and the lower limit 394, the total MVA should still be the same, i.e., MVA, should be equal to $MVA_2$. However, if the second operating point is outside the optimal operating range, the total MVA at the second operating point 414 may have declined from its value at the initial operating point 412, i.e., in such a case $MVA_2$ may be lower than $MVA_1$.

If there is no change in the total MVA, the block 460 passes the control back to the block 458, and the block 458 again decreases the power factor and determines total MVA of the generator 106. However, if the total MVA has declined as a result of the change in the power factor, a block 462 saves the previous power factor, which may be denoted by an operating point 416. In an implementation of the program 450, the block 460 may compare the change in the total MVA of the generator 106 against a threshold value and if the change is greater than the threshold value it may determine that the operating point 416 denotes the actual upper limit. The threshold value may be provided by a user of the generator 106 or it may be determined based on previous observations of the reactive capability curves of the generator 106.

The operating point 416 denotes the actual upper limit of the actual optimal operating range at the initial load level denoted by the arc 410. It can be seen that in the present example denoted in FIG. 8, the operating point 416 is on the actual upper limit 400 which is different than the estimated upper limit 392 specified by the manufacturer of the generator 106. However, in an alternate case the actual upper limit operating point 416 may be above or on the estimated upper limit 392. A block 462 saves the data related to the operating point 416.

Subsequently, a block 464 increases the load level of the generator to a second load level higher than first low load level. A block 466 determines whether the second load level is the maximum load level for the generator 106 or not. If the second load level is not the maximum load level, the program 450 passes control back to the block 456 and determines the actual upper operating limit of the generator 106 at the second load level. If the block 466 determines that that the second load level is the maximum load level, the control passes to a block 468.

The block 468 regresses the data regarding the various actual upper limit points, such as the operating point 416, to determine the location of the actual upper operating limit 400. Note that while the program 450 is illustrated in here to determine only the actual upper limit 400, the actual lower limit 404 may also be determined in a similar manner. For example, the block 458 may gradually decrease the power factor in a manner so that the reactive power (MVAR) of the generator 106 is leading the real power (MW) of the generator 106, i.e., the power factor is a leading power factor.

The block 468 may also compare the shape of the actual upper limit 400 and the actual lower limit 404 at any given time with their previous shapes to determine if there is any trend in the manner in which the optimal operating range 390 is changing over time. Moreover, the block program 450 may also analyze the shape of the actual upper limit 400 and the actual lower limit 404 at any given time to diagnose the health of the generator 106.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall with in the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of determining a transitional operating point of a generator, the transitional operating point corresponding to a particular load level, the method comprising:
    setting the operating point of the generator to the particular load level;
    setting the operating power factor of the generator close to one;
    measuring total power of the generator;
    incrementally decreasing the operating power factor of the generator and measuring incremental change in the total power of the generator;
    comparing the incremental change in the total power of the generator to a threshold; and
    if the incremental change is greater than the threshold, storing the operating power factor as the transitional operating power factor at the particular load level.

2. A method of claim 1, further comprising at least one of: (1) allowing a user of the generator to determine the threshold value and (2) determining the threshold based on historical values of the transitional operating point.

3. A method of claim 1, wherein decreasing the operating power factor comprises decreasing the operating power factor in a manner such that the resulting operating power factor is a lagging power factor.

4. A method of claim 1, further comprising setting the operational load point to a plurality of operating levels, wherein each of the plurality of operating levels is below a maximum load capacity of the generator and determining a plurality of transitional operating points of the generator at each of the plurality of operating load levels.

5. A method of claim 4, further comprising:
    storing each of the plurality of transitional operating points;
    representing the plurality of transitional operating points by a neural network; and
    using the neural network in an economic dispatch program used to allocate a power demand to the generator.

* * * * *